Sept. 14, 1948.    LE ROY W. SLY    2,449,254
TRICYCLE

Filed Feb. 3, 1945    2 Sheets-Sheet 1

INVENTOR
LeRoy W. Sly
BY
ATTORNEYS

Sept. 14, 1948.    LE ROY W. SLY    2,449,254
TRICYCLE

Filed Feb. 3, 1945    2 Sheets-Sheet 2

INVENTOR
LeRoy W. Sly
BY Webster & Webster
ATTORNEYS

Patented Sept. 14, 1948

2,449,254

UNITED STATES PATENT OFFICE 2,449,254

TRICYCLE

Le Roy W. Sly, Kyburz, Calif.

Application February 3, 1945, Serial No. 575,973

1 Claim. (Cl. 301—2.5)

This invention relates in general to a tricycle for children, and in particular the invention is directed to, and it is an object to provide, a unique tricycle wherein the frame assembly and certain related parts comprise a structure formed of standard—and thus readily obtainable—pipe fittings.

Another object of this invention is to provide a tricycle, as above, arranged so that the main frame may be elongated, the seat elevated, etc., merely by substitution of standard pipe fittings of greater length; this adjustability being advantageous in that the tricycle can be proportionately adjusted as the child grows to larger size.

A further object is to provide the tricycle with wheels of wood or the like, and to mount said wheels in a novel manner.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views.

Figure 1:
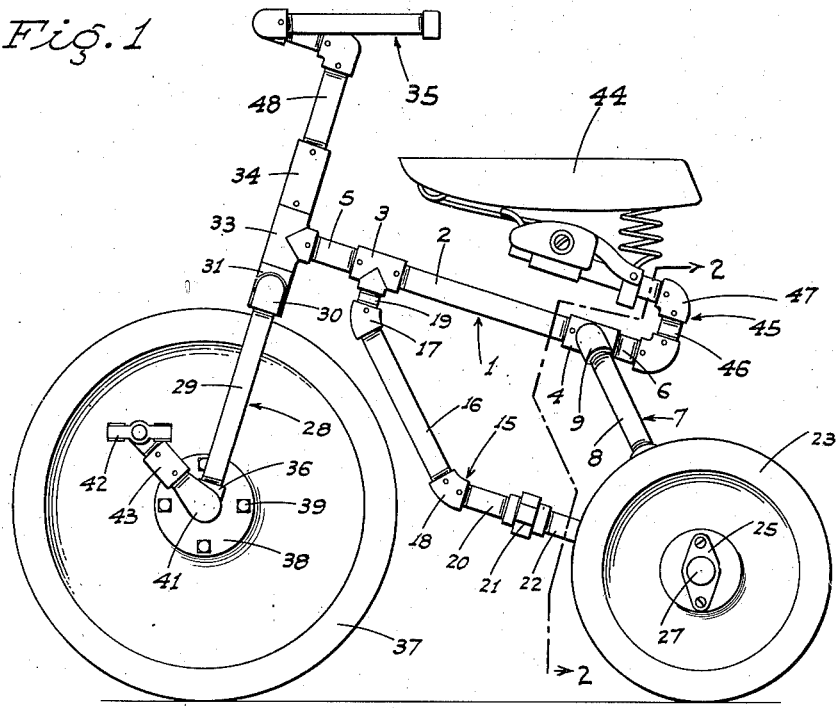
Figure 1 is a side elevation of the tricycle.
Figure 2:
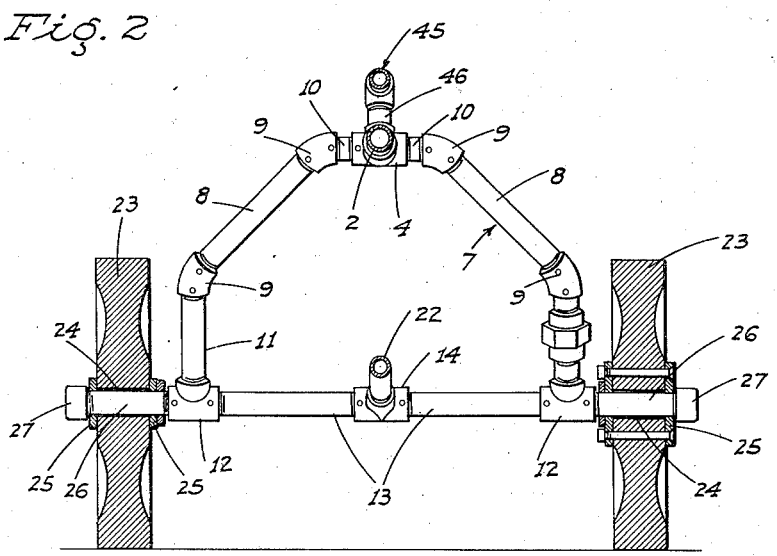
Figure 2 is a cross section on line 2—2 of Fig. 1.
Figure 3:
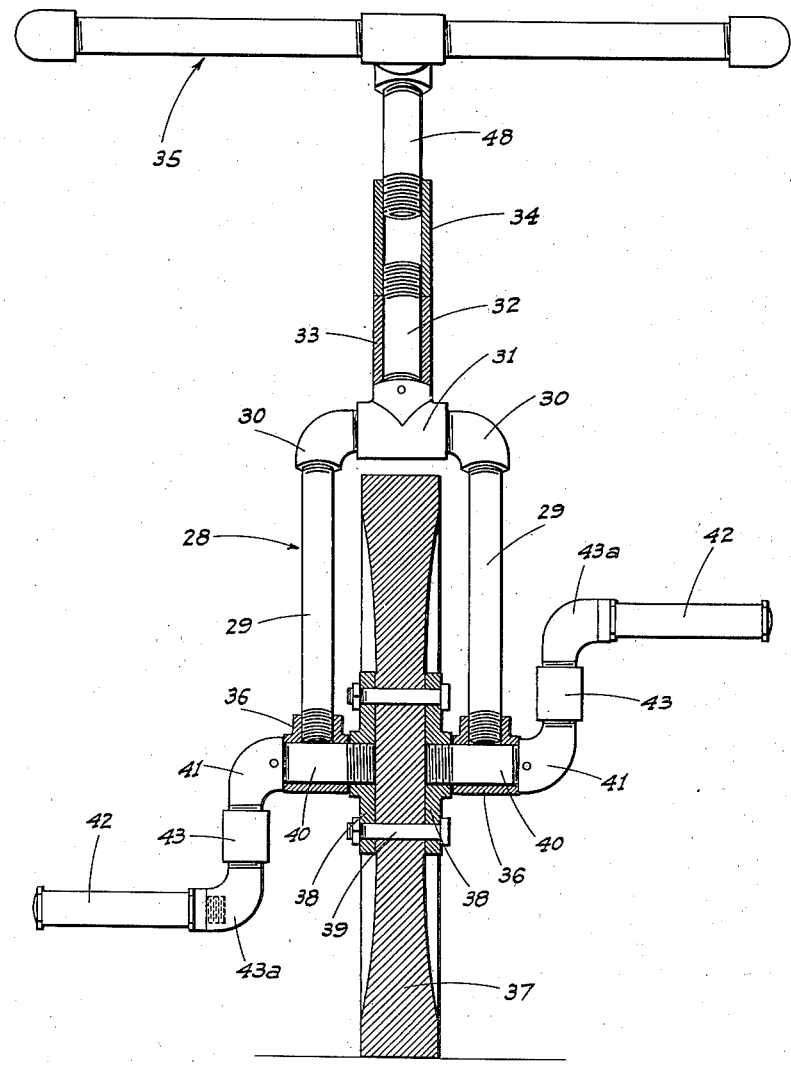
Figure 3 is a front elevation of the tricycle, partly in section.

Referring now more particularly to the characters of reference on the drawings, the tricycle comprises a main frame indicated generally at 1, said main frame including a top bar comprising a length of pipe 2 threaded at its forward end into a T 3 and threaded at its rear end into a cross 4. The T 3 is fitted at its forward end with a nipple 5, while another nipple 6 is threaded into and projects rearwardly from the cross 4. The main frame 1 also includes, at the rear thereof, a pair of downwardly and rearwardly diverging legs, indicated generally at 7, each of which includes a length of pipe 8, a pair of 45° L's 9 connected to opposite ends of the length of pipe 8, a nipple 10 connecting the uppermost 45° L with the adjacent side of the cross 4, and a lower and somewhat longer, vertical nipple 11 connecting the lowermost 45° L with a T 12. The T's 12 are disposed in axial alinement transversely of the tricycle and are connected together by lengths of pipe 13 which are threaded at adjacent ends into a T 14.

A brace assembly, indicated generally at 15, connects between the T 3 and the T 14 and comprises a rearwardly and downwardly extending length of pipe 16 threaded at opposite ends into 45° L's 17 and 18; the L 17 being connected by a nipple 19 with the T 3, while the L 18 is connected by a nipple 20 with a union 21. A length of pipe 22 connects between the other side of the union 21 and the T 14.

The rear wheels 23 of the tricycle are turned from wood formed with an axial bore 24. Each wheel 23 at opposite ends of its bore 24 is fitted with a flange 25 having a matching bore. A nipple 26 is threaded into the outer end of each T 12 and extends through the corresponding wheel 23 and the flanges 25. The wheels 23 are retained against escape from the nipples 26 by end caps 27.

At the front of the main frame 1 it includes a front-wheel fork, indicated generally at 28; said fork comprising a pair of transversely spaced, parallel downwardly and forwardly inclined lengths of pipe 29 connected at their upper end by street L's 30 with opposite sides of a T 31. A nipple 32 is threaded into the T 31 and projects upwardly in turnable relation through a T 33 secured to the forward end of the nipple 5, the vertical bore of the T 33 being machined smooth for passage of said nipple 32. The latter extends above the T 33 and is threaded into a coupling sleeve 34. The coupling sleeve 34 turnably mounts the fork 28 in connection with the main frame but prevents its displacement therefrom. At its upper end the coupling sleeve 34 supports the handle bar assembly, indicated generally at 35, and which assembly is constructed of a plurality of pipe fittings, as shown.

The lengths of pipe 29 of the fork 28 are rethreaded at their lower ends into the lateral boss of T's 36, the latter being smooth-bored transversely and axially alined.

The front wheel 37 of the tricycle is turned from wood and on opposite sides is provided with circular floor flanges 38 secured to the wheel by cross bolts 39. Nipples 40 are threaded into the floor flanges 38 and turnably extend through the T's 36 to a termination outwardly thereof. At their outer ends the nipples 40 are fitted with street L's 41 disposed with their legs in oppositely projecting relation, and to which legs tricycle pedals 42 are connected by coupling sleeves 43 and other street L's 43a.

A conventional tricycle seat 44 is connected with the main frame 1 in overhanging relation thereto by a U-shape supporting assembly, indicated generally at 45, and which is carried by the nipple 6. The assembly 45 includes an upstanding nipple 46 connected between 90° L's 47, the lowermost one of which is connected with said nipple 6.

All threaded connections, where there is any possibility of said connections unthreading and separating, are connected by cross pins, as indicated.

The tricycle as constructed above is not only unique in appearance, but is very practical and useful, providing the child with a long wearing vehicle. By reason of the described construction of the tricycle various adjustments thereof can be accomplished easily by merely substituting certain of the pipe fittings with other ones. For example, the seat 44 may be raised by changing the nipple 46; the length of the main frame 1 can be altered by changing the length of pipe 2 and the nipple 20; and the handlebar unit 35 can be raised by changing the main supporting nipple thereof, which is indicated at 48. Other adjustments obviously suggest themselves from an inspection of the assembly.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful and upon which Letters Patent is desired:

A wheel and crank axle mounting for a cycle comprising a supporting fork having threaded terminals, a T threaded on each threaded end of the fork, such T's being axially alined and smooth bored from end to end, a wheel having a hub provided with central alined threaded orifices, stub shafts mounted in the bores of the T's, such stub shafts comprising end threaded pipe nipples, each nipple being threaded into one of the hub orifices, and a foot crank threaded onto the outer end of each nipple.

LE ROY W. SLY.

REFERENCES CITED

The following references are of record in the file of this patent:

UNITED STATES PATENTS

| Number | Name | Date |
|---|---|---|
| 119,504 | Brooks | Oct. 3, 1871 |
| 245,434 | Bean | Aug. 9, 1881 |
| 1,457,842 | Kashmere et al. | June 5, 1923 |
| 1,587,930 | Wetzel | June 8, 1926 |
| 1,727,262 | Wolfe | Sept. 3, 1929 |